United States Patent [19]
Koudate et al.

[11] Patent Number: 5,773,542
[45] Date of Patent: Jun. 30, 1998

[54] PROCESS FOR PRODUCING POLYMER PARTICLES

[75] Inventors: Takashi Koudate; Yasunori Hosokawa; Yoko Hanada, all of Wakayama, Japan

[73] Assignee: Kao Corporation, Tokyo, Japan

[21] Appl. No.: 620,302

[22] Filed: Mar. 22, 1996

[30] Foreign Application Priority Data

Mar. 23, 1995 [JP] Japan ..................... 7-064420

[51] Int. Cl.$^6$ ...................................... C08F 2/00
[52] U.S. Cl. ........................... 526/215; 526/248
[58] Field of Search ............................. 526/215

[56] References Cited

U.S. PATENT DOCUMENTS

| | | | |
|---|---|---|---|
| 2,917,477 | 12/1959 | Suen et al. | 526/215 |
| 4,170,699 | 10/1979 | Wright | 526/215 |
| 4,188,349 | 2/1980 | Markiewitz et al. | 526/215 |
| 4,920,187 | 4/1990 | Kashihara et al. | 526/215 |
| 4,959,060 | 9/1990 | Shimomura et al. | |
| 4,972,019 | 11/1990 | Obayashi et al. | |

FOREIGN PATENT DOCUMENTS

| | | | |
|---|---|---|---|
| 0214758 | 3/1987 | European Pat. Off. | |
| 0257951 | 6/1988 | European Pat. Off. | |
| 0372981 | 8/1988 | European Pat. Off. | |
| 0586976 | 3/1994 | European Pat. Off. | |
| 50-114488 | 9/1975 | Japan | 526/215 |
| 63-146964 | 1/1987 | Japan | |
| 63-272349 | 6/1987 | Japan | |
| 534383 | 8/1988 | Japan | |
| 2255804 | 10/1990 | Japan | |
| 3-179008 | 9/1991 | Japan | |
| 1391598 | 4/1975 | United Kingdom | 526/215 |

OTHER PUBLICATIONS

Khan et al., J. Am. Chem. Soc., 89, No. 16, pp. 4176–4185 (1967).
Buettner, Free Rad. Res. Comms., 1, No. 6, pp. 349–353 (1986).
Herp et al., Carbohydrate Research, 4, pp. 63–71 (1967).

*Primary Examiner*—Joseph L. Schofer
*Assistant Examiner*—N. Sarofim
*Attorney, Agent, or Firm*—Birch, Stewart, Kolasch & Birch, LLP

[57] ABSTRACT

A process for producing polymer particles comprising polymerizing a water-soluble polymerizable monomer in a system comprising a hydrophobic organic solvent inert to the polymerization and an aqueous solution of the water-soluble polymerizable monomer, the process being characterized in that the polymerization is carried out in the presence of, as a dispersant, an anionic surface active agent represented by formula (I):

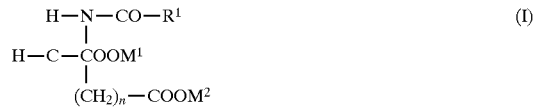

wherein $R^1$ represents a straight-chain or branched alkyl, alkenyl or 2-hydroxyalkyl group having 5 to 29 carbon atoms; $M^1$ and $M^2$, which may be the same or different, each represent an alkali metal ion, an ammonium ion or a hydrogen atom; and n represents 1 or 2.

8 Claims, 1 Drawing Sheet

PROCESS FOR PRODUCING POLYMER PARTICLES

BACKGROUND OF THE INVENTION

1. Field of the Invention

This invention relates to a process for producing polymer particles which have high stability, excellent water absorptivity, and excellent liquid permeability and are useful as water-absorbing resins. More particularly, it relates to a process for producing polymer particles having such high stability that the degree of deterioration by degradation on absorbing an aqueous liquid or body fluids, such as urine, blood or perspiration, is small.

2. Description of the Related Art

Superabsorbent resins have widely been used as absorbent articles, such as disposable diapers for babies, adults or those suffering from incontinence of urine or sanitary napkins in the field of sanitation; as water-retaining materials in the field of agriculture and horticulture; and as sludge coagulants, moisture condensation preventive agents, and water stopping agents in the field of civil engineering.

It is known, however, that water-soluble or swellable polymers constituting such superabsorbent resins undergo molecular weight reduction (degradation) and deterioration with time in the presence of a radical generating species, such as hydrogen peroxide or L-ascorbic acid or a salt thereof. Because L-ascorbic acid or a salt thereof is present in body fluids, such as urine, blood, and perspiration, it has been a serious problem that a superabsorbent resin, when used as an absorbent member of disposable diapers or sanitary napkins, undergoes deterioration, degradation, and reduction in body fluid retentive capacity with time due to the radicals generated from. L-ascorbic acid (or a salt thereof).

The degradation reaction of a water-soluble polymer or a crosslinked polymer thereof due to radical generating species is conspicuous in a water-containing condition, and especially in the presence of transition metal ions capable of having oxidation number of two or more, such as iron ions or copper ions, in an air atmosphere.

This is because traces of transition metal ions, such as iron or copper, serve as catalysts to markedly accelerate decomposition and radical generation reaction of hydrogen peroxide or L-ascorbic acid or a salt thereof as described, e.g., in *J. Am. Chem. Soc.*, Vol. 89, No. 16, p. 4176 (1967) and *Free Radical Research Communications*, Vol. 1, No. 6, p. 349 (1986).

It is known that, like the radical generating species, e.g., hydrogen peroxide or L-ascorbic acid or a salt thereof, such metallic ions can sever water-soluble polymer chains with time (see, for example, *Carbohydrate Research*, Vol. 4, p. 63 (1967)).

Means that have been widely employed for suppressing decomposition and deterioration of superabsorbent polymers include (1) sealing of a superabsorbent polymer under reduced pressure or in a nitrogen atmosphere to avoid contact with air (especially with oxygen), (2) use of highly purified water and reagents to inhibit incorporation of metal ions into a superabsorbent polymer, (3) addition of an antioxidant or a reducing agent to a superabsorbent polymer, (4) addition of a protein or an enzyme to a superabsorbent polymer, and (5) addition of a metal chelating agent, such as citric acid, (poly)phosphoric acid or salts thereof, or ethylenediaminetetraacetic acid (EDTA) or salts thereof, to a superabsorbent polymer (Japanese Patent Application Laid-Open 63-146964 corresponding to EP-A-257951).

In many cases, however, means (1) and (2) are impossible to carry out for some end uses of a superabsorbent polymer. Means (3), (4) and (5) including addition of a known additive to suppress decomposition and deterioration of a superabsorbent polymer are not always sufficiently effective. Cases are often met with in which the additive must be added in a large quantity or an additive having a very strong action must be used. Under such a situation, it is likely that the inherent physical properties or performances of superabsorbent polymers may be seriously impaired.

In fact, various additives have been proposed to date. For example, Japanese Patent Application Laid-Open 63-272349 (corresponding to EP-A-268459 and U.S. Pat. No. 4,959,060), Japanese Patent Publication 5-34383 (corresponding to EP-A-249391 and U.S. Pat. No. 4,972,019), and Japanese Patent Application Laid-Open 2-255804 (corresponding to EP-A-372981) and Japanese Patent Application Laid-Open 3-179008 disclose methods of using additives such as a sulfur-containing reducing agent, an oxygen-containing reducing inorganic salt, or a water-soluble chain transfer agent. Nevertheless, these additives have a disadvantage of giving off an offensive odor or having insufficient storage stability over a long term.

SUMMARY OF THE INVENTION

An object of the present invention is to provide a process for producing a water-absorbing resin which undergoes little degradation and deterioration even after absorption of an aqueous liquid or a body fluid and yet exhibits high water absorptivity; the process being simple and easy to operate, involving no complicated operations compared with the conventional techniques.

As a result of extensive investigations, the inventors of the present invention have found that the above object of the present invention is accomplished by using a specific anionic surface active agent as a dispersant in carrying out polymerization of a water-soluble polymerizable monomer in a disperse system comprising a hydrophobic organic solvent inert to the polymerization and an aqueous solution of the water-soluble polymerizable monomer.

The present invention has been completed based on the above finding. It provides a process for producing polymer particles which comprises polymerizing a water-soluble polymerizable monomer in a system comprising a hydrophobic organic solvent inert to the polymerization and an aqueous solution of the water-soluble polymerizable monomer, the process being characterized in that the polymerization is carried out in the presence of an anionic surface active agent represented by formula (I) shown below as a dispersant.

The polymer particles produced according to the present invention are, in general, non-spherical, and irregular-shaped particles having uneven surfaces.

wherein $R^1$ represents a straight-chain or branched alkyl, alkenyl or 2-hydroxyalkyl group having 5 to 29 carbon atoms; $M^1$ and $M^2$, which may be the same or different, each represent an alkali metal ion, an ammonium ion or a hydrogen atom; and n represents 1 or 2.

According to the process for producing polymer particles of the present invention, an absorbent resin, which undergoes little degradation and deterioration even after absorption of an aqueous liquid or a body fluid and yet exhibits high water absorptivity, is produced through easy operation without requiring complicated operations compared with the conventional techniques.

More specifically, the polymer particles obtained by the process of the present invention are irregular-shaped polymer particles having a non-spherical shape, an average particle size of not smaller than 10 μm as measured by sieving method according to JIS Z-8801-1982, and a high void content. Therefore, the water-absorbing resin which is an agglomerate of the polymer particles is excellent in its rate of water absorption, air permeability, liquid permeability, and gel strength after water absorption. Further, the superabsorbent resin produced by the present invention undergoes little degradation and deterioration even in a dissolved state in, or in the presence of, water containing a radical generating species, e.g., hydrogen peroxide or L-ascorbic acid, and a transition metal, e.g., iron or copper, exhibits excellent stability, and also assures high ecological safety.

DETAILED DESCRIPTION OF THE INVENTION

The present invention will be described below in detail. Unless otherwise indicated, all the percents are given by weight.

The water-soluble polymerizable monomer which can be used in the present invention includes vinyl monomers having a polymerizable unsaturated group, such as olefinic unsaturated carboxylic acids or salts thereof, olefinic unsaturated carboxylic acid esters, olefinic unsaturated sulfonic acids or salts thereof, olefinic unsaturated phosphoric acids or salts thereof, olefinic unsaturated amines, olefinic unsaturated ammonium salts, and olefinic unsaturated amides.

The olefinic unsaturated carboxylic acids or salts thereof include acrylic acid, methacrylic acid, maleic acid, fumaric acid, or alkali salts of these acids. The olefinic unsaturated carboxylic esters include methoxypolyethylene glycol (meth)acrylate, phenoxypolyethylene glycol (meth)acrylate, and hydroxyethyl (meth)acrylate. The olefinic unsaturated sulfonic acids or salts thereof include (meth) acrylamidomethylpropanesulfonic acid, allylsulfonic acid, and alkali salts thereof. The olefinic unsaturated phosphoric acids or salts thereof include (meth)acryloyl(poly) oxyethylenephosphoric esters or alkali salts thereof. The olefinic unsaturated amines include dimethylaminoethyl (meth)acrylate. The olefinic unsaturated ammonium salts include (meth)acryloyloxyethylenetrimethylammonium halides. The olefinic unsaturated amides include (meth) acrylamide; (meth)acrylamide derivatives, such as methyl (meth)acrylamide, ethyl(meth)acrylamide, and propyl (meth)acrylamide; and vinylmethylacetamide. These monomers may be used either individually or as a mixture of two or more thereof. The alkali salts as referred to above include alkali metal salts, alkaline earth metal salts, and ammonium salts.

Of these monomers, olefinic unsaturated carboxylic acids and alkali salts thereof are preferred, with acrylic acid, methacrylic acid, and alkali metal or alkaline earth metal salts thereof being still more preferred.

The aqueous solution of the water-soluble polymerizable monomer preferably has a monomer concentration of 1 to 70%, still preferably 10 to 65%, particularly preferably 30 to 60%.

While it is preferred to homo- or copolymerize one or more of the above-mentioned water-soluble polymerizable monomers, the monomer(s) may be used in combination with not more than 50%, based on the total monomer, of water-insoluble monomers copolymerizable with the water-soluble polymerizable monomers, such as unsaturated carboxylic acid esters having 1 to 18 carbon atoms in the alkyl moiety thereof, e.g., acrylic acid, methacrylic acid, maleic acid, and fumaric acid.

The hydrophobic organic solvent inert to the polymerization which can be used in the present invention includes aliphatic hydrocarbons, such as n-pentane, cyclopentane, n-hexane, cyclohexane, n-heptane, and methylcyclohexane; aromatic hydrocarbons, such as benzene and toluene; aliphatic alcohols having 4 to 6 carbon atoms, such as n-butyl alcohol and n-amyl alcohol; aliphatic ketones, such as methyl ethyl ketone; and aliphatic esters, such as ethyl acetate. These solvents may be used either individually or as a mixture of two or more thereof.

The hydrophobic organic solvent is preferably used at an amount of 50 to 500% based on the aqueous solution of the water-soluble polymerizable monomer.

In addition to the above-mentioned hydrophobic solvent, amphiphilic solvents may be used in combination at an amount not exceeding the amount of the hydrophobic solvent used. Examples of usable amphiphilic solvents include alcohols, such as methanol, ethanol, propanol, and 2-propanol; ketones, such as acetone; and ethers, such as tetrahydrofuran and dioxane.

The anionic surface active agent which can be used in the present invention is one represented by formula (I) shown above (hereinafter referred to as "anionic surface active agent (I)"), and is a derivative of aspartic acid or glutamic acid.

In formula (I), $R^1$ contains 5 to 29 carbon atoms, preferably 7 to 23 carbon atoms, still more preferably 11 to 23 carbon atoms. If the carbon atom number in $R^1$ exceeds 29, the water solubility is markedly reduced. If it is less than 5, the performance as a stabilizer for superabsorbent resins is reduced. $R^1$ is also preferably an alkyl group having 11 to 23 carbon atoms. Specific examples of the $R^1CO$ moiety include a lauroyl group, a myristoyl group, a palmitoyl group, a stearoyl group, an eicosanoyl group, and a docosanoyl group.

In formula (I), n is preferably 2.

While the mechanism of the improving effect on stability of the polymer obtained in the present invention is not clear, the following assumption could be made. The anionic surface active agent (I) is capable of chelating a transition metal, e.g., copper or iron. It remains in the polymer obtained by the process of the present invention and chelates and insolubilizes transition metal ions which would act as catalyst for decomposition (radical generation) of L-ascorbic acid, etc. As a result, the transition metal ions are completely sequestered, which brings about an improvement in stability of the superabsorbent resin after water absorption.

Being derived from naturally-occurring amino acids and naturally-occurring fatty acids, the anionic surface active agent (I) are of high safety and low irritation. Accordingly, there arises no problem if they are used in larger quantities, and the polymer particles obtained by the process of the present invention do no harm to humans when used as sanitary material of sanitary napkins, disposable diapers, and the like.

Examples of the anionic surface active agent (I) are monosodium N-palmitoyl-aspartate, disodium N-palmitoyl-aspartate, N-palmitoyl-aspartic acid, monosodium N-myristoylglutamate, monosodium N-lauroylglutamate, monosodium N-stearoylglutamate, monosodium N-myristoylglutamate, monosodium N-(coconut oil fatty acid acyl)glutamate, monosodium N-(hardened beef tallow fatty acid acyl)glutamate, N-stearoylglutamic acid, and monopotassium N-stearoylglutamate. These compounds may be used either individually or as mixtures thereof.

The anionic surface active agent (I) may be either a commercially available product or a product synthesized by a known process. Examples of the commercially available products are AMISOFT HS-11, LS-11, MS-11, GS-11, HK-11, HS-21, and GS-21, all produced by Ajinomoto Co., Ltd, and AMINOSURFACT (Trademark, produced by Asahi Food Ltd.)

The anionic surface active agent (I) exerts sufficient effects even at a small amount. A preferred amount of the anionic surface active agent (I) to be used is from 0.01 to 10 parts by weight, more preferably from 0.01 to 2 parts by weight, still preferably 0.05 to 1 part by weight, per 100 parts by weight of the water-soluble polymerizable monomer. An amount of less than 0.01 parts by weight tends to be too small as a dispersant to obtain polymer particles in a stable manner and to sufficiently prevent the resulting polymer from degradation and deterioration. Addition of more than 10 parts by weight is of no economical advantage. Accordingly, the above-specified range is preferred.

While the anionic surface active agent (I) is sufficiently effective as a sole dispersant, it may be used as a mixture with other anionic surface active agents or in combination with nonionic surface active agents, cationic surface active agents, amphoteric surface active agents or polymeric dispersants. A combined use of other anionic surface active agents is preferred.

The other usable anionic surface active agents preferably include those represented by formula (II) shown below, especially those represented by formula (III) shown below from the viewpoint of narrowing the distribution of the particle size of the obtained polymer particles.

$$R^2O(A)_mSO_3M^3 \quad\quad (II)$$

wherein $R^2$ represents a straight-chain or branched alkyl or alkenyl group having 6 to 22 carbon atoms, or an aryl group having 12 to 28 carbon atoms in total; A represents a straight-chain or branched alkylene or oxyalkylene group having 2 or 3 carbon atoms; $M^3$ represents an alkali metal ion, an ammonium ion or a hydrogen atom; and m represents a number of from 0 to 22 in average.

$$R^2—O—(CH_2CH_2O)_m—SO_3M^3 \quad\quad (III)$$

wherein $R^2$ represents a straight-chain or branched alkyl or alkenyl group having 6 to 22 carbon atoms or an aryl group having 12 to 28 carbon atoms in total; $M^3$ represents an alkali metal ion, an ammonium ion or a hydrogen atom; and m represents a number of from 0 to 22 in average.

Where the above-mentioned anionic surface active agent (II) is used in combination with the above-mentioned anionic surface active agent (I), the amount of these anionic surface active agents is as follows.

That is, the amount of the anionic surface active agent (I) is as described above, and the amount of the anionic surface active agent (II) is preferably 0.01 to 10 parts by weight, more preferably 0.01 to 2 parts by weight, still preferably 0.02 to 1 part by weight, per 100 parts by weight of the water-soluble polymerizable monomer.

Also, the anionic surface active agent represented by formula (III) may be a commercially available product, such as EMAL E-27C (sodium polyoxyethylene lauryl ether sulfate) and EMAL 20C (sodium polyoxyethylene lauryl ether sulfate), both produced by Kao Corp., or may be synthesized by a known process.

Polymerization of the water-soluble polymerizable monomer using a hydrophobic organic solvent and an aqueous solution of the water-soluble polymerizable monomer can be carried out according to any one of the following methods (1) through (4):

(1) A method in which an aqueous solution of a water-soluble polymerizable monomer and a hydrophobic organic solvent are mixed all at once, followed by polymerization (all-at-once polymerization).

(2) A method in which an aqueous solution of a water-soluble polymerizable monomer is added dropwise to a hydrophobic organic solvent to effect polymerization gradually (gradual polymerization).

(3) A method in which an aqueous solution of a water-soluble polymerizable monomer is previously mixed with, or dispersed in, a part of a hydrophobic organic solvent, and the resulting mixture is added dropwise to the rest of the hydrophobic organic solvent to conduct polymerization (pre-dispersion).

(4) A combination of methods (1) to (3).

The anionic surface active agent is made to be present in the polymerization system in accordance with, for example, the following manners (1) to (4):

(1) The anionic surface active agent is previously dispersed in the hydrophobic organic solvent.

(2) The surface active agent is previously dissolved or dispersed in an aqueous solution of the water-soluble polymerizable monomer.

(3) The anionic surface active agent is slowly added to the system during polymerization.

(4) A combination of (1) to (3).

A polymerization initiator is preferably used in carrying out the polymerization. The polymerization initiator to be used is not particularly limited. Examples of suitable initiators include ketone peroxides, e.g., methyl ethyl ketone peroxide and methyl isobutyl ketone peroxide; dialkyl peroxides, e.g., di-t-butyl peroxide and t-butylcumyl peroxide; alkyl peresters, e.g., t-butyl peracetate, t-butyl perisobutyrate, and t-butyl perpivalate; hydroperoxides, such as t-butyl hydroperoxide and cumene hydroperoxide; hydrogen peroxide; persulfates, e.g., potassium persulfate and ammonium persulfate; perchlorates, e.g., potassium perchlorate and sodium perchlorate; halogenic acid salts, e.g., potassium chlorate and potassium bromate; and azo compounds, e.g., 2-(carbamoylazo)isobutyronitrile, 2,2-azobis(N,N'-dimethyleneisobutylamidine) dihydrochloride, 2,2'-azobis(2-amidinopropane) dihydrochloride, 2,2'-azobis(N,N'-dimethyleneisobutylamidine), 4,4'-azobis(4-cyanopentanoic acid), azobisisobutyronitrile, 2,2'-azobis(4-methoxy-2,4-dimethylvaleronitrile), (1-phenylethyl) azodiphenylmethane, dimethyl-2,2'-azobisisobutyrate, 2,2'- azobis(2-methylbutyronitrile), 1,1'-azobis(1-cyclohexanecarbonitrile), 2,2'-azobis(2,4,4'-trimethylpentane), 2-phenylazo-2,4-dimethyl-4-methoxyvaleronitrile, and 2,2'-azobis(2-methylpropane). These initiators may be used either individually or as a mixture of two or more thereof.

The polymerization initiator may be combined with a reducing agent, such as a sulfite, L-ascorbic acid or a ferrous salt, to provide a redox initiator system. Of the above-enumerated polymerization initiators, potassium persulfate and 2,2'-azobis(2-amindinopropane) dihydrochloride are preferably used.

The polymerization initiator is used at an amount usually of from 0.01 to 10%, and preferably of from 0.02 to 5%, based on the water-soluble polymerizable monomer.

While the manner of addition of the polymerization initiator is not particularly restricted, it is preferred to add it previously to the aqueous solution of the water-soluble polymerizable monomer.

The polymerization is suitably carried out at a temperature of 20° to 120° C., preferably 40° to 100° C. If the polymerization temperature exceeds 120° C., crosslinking tends to proceed excessively, and extreme reduction in water absorptivity of the resulting polymer particles can result. If the temperature is lower than 20° C., the rate of polymerization unfavorably tends to be reduced.

A known crosslinking agent may be added to the polymerization system at any stage of before, during and after the polymerization. Suitable crosslinking agents include polyallyl compounds, such as N,N-diallylacrylamide, diallylamide, diallylmethacrylamide, diallyl phthalate, diallyl maleate, diallyl terephthalate, triallyl cyanurate, and triallyl phosphate; polyvinyl compounds, such as divinylbenzene, N,N-methylenebisacrylamide, ethylene glycol diacrylate, polyethylene glycol diacrylate, ethylene glycol dimethacrylate, polyethylene glycol dimethacrylate, and glycerol trimethacrylate; polyglycidyl ethers, such as ethylene glycol diglycidyl ether, polyethylene glycol diglycidyl ether, and polyglycerol polyglycidyl ether; halo-epoxy compounds, such as epichlorohydrin and α-methylchlorohydrin; polyaldehydes, such as glutaraldehyde and glyoxal; polyols, such as glycerol; polyamines, such as ethylenediamine; hydroxyvinyl compounds, such as 2-hydroxyethyl methacrylate; and inorganic or organic salts of a metal capable of providing a polyvalent ion, such as calcium, magnesium, zinc or aluminum.

Monoglycidyl compounds, such as phenol polyoxyethylene glycol ether, may be used as a modifier.

The amount of the crosslinking agent or modifier to be used is arbitrarily selected according to the desired properties of the final product polymer. They are usually used at an amount of 0.01 to 10% based on the polymer produced.

In carrying out the process of the present invention, the resulting polymer particles may be subjected to surface treatment with a polymeric compound having a functional group. Examples of the polymeric compounds include polyethyleneimine, polyvinyl alcohol, and polyallylamine. These polymeric compounds may be used either individually or in combination with various crosslinking agents described above.

While the anionic surface active agent (I) alone is sufficiently effective to prevent degradation of water-absorbing resins, other compounds effective to prevent degradation of water-absorbing resins may be added separately.

The manner of addition of the other compounds is not particularly restricted as long as the compounds may be added to a water-absorbing resin uniformly. For example, the compound can be mixed with an aqueous solution of a water-soluble polymerizable monomer at the polymerization step, mixed with the reaction system at the polymerization step, or sprayed onto the resulting polymer in the form of a solid, an aqueous solution or a dispersion. It is also possible that the anionic surface active agent (I) is similarly added to the polymer after completion of the polymerization.

After the polymerization, the polymer produced is dried by means of a vacuum drier, a fluidized bed drier, etc., either as it is or after removing the solvent by decantation or centrifugal separation, to obtain irregular-shaped polymer particles. If necessary, the polymer particles thus obtained may be subjected to grinding or granulation.

The polymer particles obtained by the process of the present invention are effectively used in application where the polymer is used in contact with a radical generating species (e.g., ascorbic acid) present in cosmetics, food additives, and the like. They are particularly useful in application as superabsorbent resins of absorbent members of disposable diapers, sanitary napkins, etc., where high safety on use is demanded.

While it is unclear why the polymer particles obtained by the process of the present invention have an irregular shape, the following assumption could be made. Polymer particles obtained by general suspension polymerization or emulsion polymerization in an O/W system have a spherical shape. In contrast, as is disclosed in Japanese Patent Application Laid-Open 6-93008 (corresponding to EP-A-586976), when an anionic surface active agent is present in the polymerization system of a water-soluble monomer, it seems that the system is maintained in a slightly unstable W/O condition as the polymerization proceeds. As a result, the resulting polymer particles have a high void content and an irregular shape, while retaining a moderate particle size owing to the ionic groups.

The polymer particles obtained by the process of the present invention exhibit high stability with time in body fluids, such as urine, blood and perspiration, even when prepared with a reduced amount of a crosslinking agent so as to retain high water absorptivity. Since the polymer has an irregular shape with a high void content, it has excellent liquid permeability and high gel strength and is therefore suitable as superabsorbent resin for use as absorbent member of sanitary products, such as sanitary napkins and disposable diapers.

The present invention will now be illustrated in greater detail with reference to Examples and Comparative Examples, but it should be understood that the present invention is not construed as being limited thereto.

Tests in Examples and Comparative Examples were carried out according to the following test methods.

Measurement of Average Particle Size

A polymer weighing 100 g was classified using sieves specified by JIS Z-8801-1982. An average particle size was calculated from the weight percent of each fraction.

Measurement of Equilibrated Water Absorption on Swelling

One gram of a polymer was dispersed in a large excess of physiological saline (0.9% aqueous solution of sodium chloride) and allowed to be swollen until the water absorption came to equilibrium. The polymer was collected by filtration through a 80 mesh metal net and weighed. The weight of the swollen polymer (W) was divided by the weight of the polymer before water absorption ($W_0$) to obtain an equilibrated water absorption on swelling ($W/W_0$).

Measurement of Water Absorption Representing Rate of Water Absorption

Figure 1:
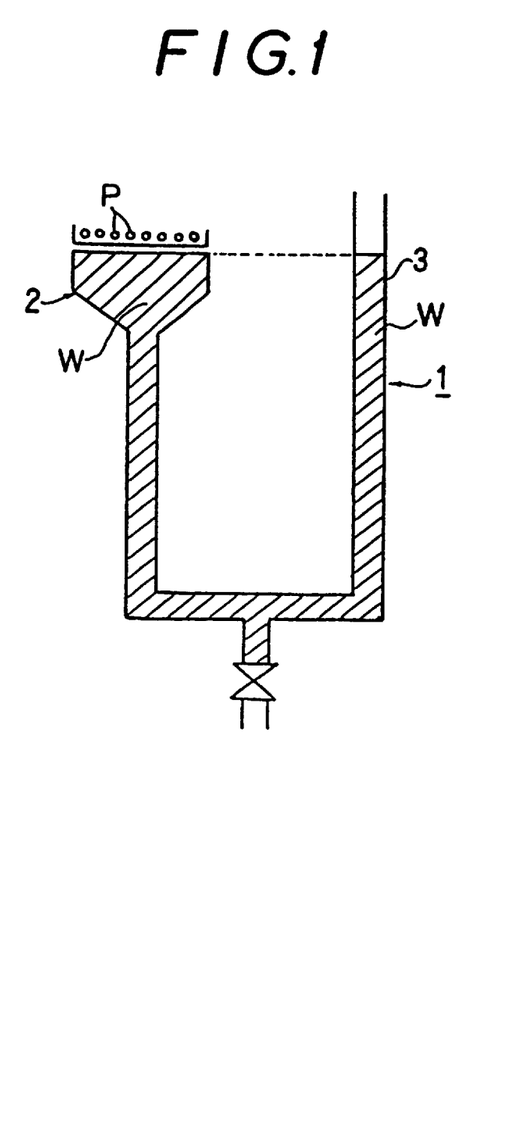
FIG. 1 is a schematic illustration of an apparatus used in Examples and Comparative Examples for measuring a rate of water absorption.

A demand wettability tester 1 shown in FIG. 1 which is generally known as an apparatus for carrying out a DW method was used. As shown in FIG. 1, physiological saline W was put in the tester with the two liquid levels being equal, and 0.3 g of polymer P was scattered on a mount 2 (diameter: 70 mm; No. 1 glass filter having placed thereon No. 2 filter paper). Taking the water absorption at the time of scattering the polymer as zero, the water absorption after 60 seconds was measured by reading the scale on the burette 3 indicating a drop of the liquid level of physiological saline W. The measured value was taken as a water absorption (ml) representing the rate of water absorption.

Measurement of Rate of Permeation of Physiological Saline

Figure 2:
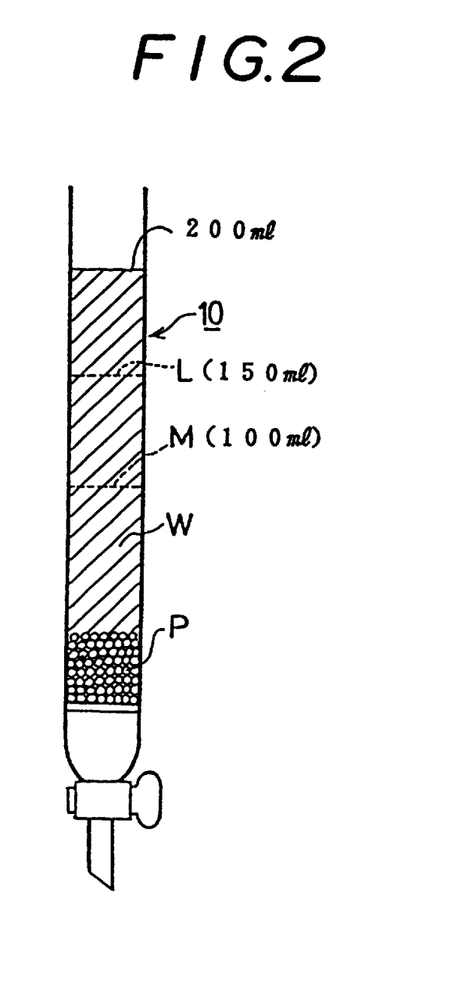
FIG. 2 is a schematic illustration of an apparatus used in Examples and Comparative Examples for measuring a rate of permeation of physiological saline.

In an apparatus 10 shown in FIG. 2 (a burette having a glass cylinder, the cylindrical part of which has an inner diameter of 25.6 mm and a length of about 500 mm) was put 0.5 g of a polymer P and swollen to equilibrium with excess physiological saline W. The stopcock was closed with the liquid level adjusted to a height of 200 ml from the bottom. On confirming that the swollen polymer P had been sedimented sufficiently as illustrated, the stopcock was opened, and the time required for the physiological saline W to pass through the section between two gage marks, L (150 ml high from the bottom) and M (100 ml high from the bottom), which corresponds to a 50 ml portion, was measured. The amount (ml) of the liquid between the gage marks was divided by the measured time (min) to obtain a rate of permeation of physiological saline (hereinafter sometimes referred to as rate of liquid permeation) (ml/min).

Stability of Polymer Particles

One gram of a polymer was swollen with 45 g of physiological saline containing L-ascorbic acid in a concentration of 0.05 wt %. The swollen polymer particles were put in a screw tube, the tube was placed in a thermostat set at 40° C., and after 3 hours the state of the gel was observed.

The stability of the polymer particles was evaluated according to the following four grades:

A . . . The swollen particles retained their original shape, showing no fluidity nor stringiness.

B . . . The swollen particles retained their original shape, though showing slight fluidity and stringiness.

C . . . The swollen particles were not dissolved but showed fluidity and stringiness. The shape of the particles was unclear.

D . . . Part of the swollen particles were dissolved into liquid. A major portion of the particles lost their shape.

Those polymer samples graded "A" or "B" are suitable as water-absorbing polymer for use in sanitary napkins, disposable diapers, bed sheets for adults, tampons, sanitary wadding, and the like.

EXAMPLE 1

Acrylic acid (72.1 g) was diluted with 18.0 g of water and neutralized with 98.9 g of a 30 wt % aqueous solution of sodium hydroxide while cooling. To the solution were added 10.7 g of a 2.8 wt % aqueous solution of potassium persulfate as initiator and 1 g of a 0.36% aqueous solution of an epoxy type crosslinking agent (polyglycerol polyglycidyl ether DENOCOL EX-512, produced by Nagase Kasei K.K.) to prepare a uniform monomer/initiator aqueous solution.

Separately, 283 ml of cyclohexane was put into a 500 ml flask equipped with a reflux condenser, a dropping funnel, a stirring rod, and a tube for introducing nitrogen, and a solution of 1.76 g of sodium acylated glutamate (AMISOFT HS-11, produced by Ajinomoto Co., Ltd.) in 6.2 g of water was added thereto, followed by stirring at 300 rpm to disperse. After displacing the atmosphere with nitrogen, the bath temperature was raised to 75° C.

The above-prepared monomer/initiator aqueous solution was added dropwise to the flask over a period of 60 minutes. After completion of the addition, the mixture was further stirred at 75° C. for 0.25 hour and then at a bath temperature of 80° C. for 2 hours to conduct polymerization. During the reaction, water of the refluxing water/cyclohexane azeotropic mixture was driven out of the system to adjust the water content of the resulting water-absorbing resin at 30 parts by weight or lower per 100 parts by weight of the resin.

After completion of the polymerization, the product was fractionated and dried under reduced pressure to obtain 88.4 g of partially crosslinked sodium acrylate polymer particles as irregular-shaped gel granules. The average particle size, equilibrated water absorption on swelling, water absorption representing the rate of water absorption, rate of permeation of physiological saline, and particle stability of the resulting irregular-shaped polymer particles were measured. The results obtained are shown in Table 1 below.

EXAMPLE 2

Partially crosslinked sodium acrylate polymer particles as irregular-shaped gel granules were obtained in the same manner as in Example 1, except for replacing the aqueous solution of potassium persulfate aqueous solution as an initiator with 5.4 g of a 1.3 wt % aqueous solution of 2,2'-azobis(2-amidinopropane) dihydrochloride. The same measurements as in Example 1 were carried out for the resulting irregular-shaped polymer particles. The results obtained are shown in Table 1 below.

EXAMPLE 3

To the monomer/initiator aqueous solution as prepared in Example 1 was further added a solution of 1.76 g of sodium acylated glutamate (AMISOFT HS-11) in 6.2 g of water to prepare a uniform monomer/initiator/dispersant aqueous solution.

Separately, 283 ml of cyclohexane was put in a 500 ml flask equipped with a reflux condenser, a dropping funnel, a stirring rod, and a tube for introducing nitrogen and stirred at 300 rpm. After displacing the atmosphere with nitrogen, the bath temperature was raised to 75° C. The above prepared monomer/initiator/dispersant aqueous solution was added dropwise to the flask over a 60-minute period. After the addition, the same procedure as in Example 1 was repeated to obtain partially crosslinked sodium acrylate polymer particles as irregular-shaped gel granules. The same measurements as in Example 1 were carried out for the resulting irregular-shaped polymer particles. The results obtained are shown in Table 1 below.

EXAMPLE 4

To the monomer/initiator aqueous solution as prepared in Example 1 were further added a solution of 1.76 g of sodium acylated glutamate (AMISOFT HS-11) in 6.2 g of water and 0.29 g of a 25 wt % aqueous solution of sodium polyoxyethylene lauryl ether sulfate (average number of added moles of ethylene oxide=2) to prepare a uniform monomer/initiator/dispersant aqueous solution. Partially crosslinked sodium acrylate polymer particles as irregular-shaped gel granules were obtained in the same manner as in Example 1, except for replacing the monomer/initiator aqueous solution with the above prepared monomer/initiator/dispersant aqueous solution. The same measurements as in Example 1 were carried out for the resulting irregular-shaped polymer particles. The results obtained are shown in Table 1 below.

EXAMPLE 5

In a 500 ml flask equipped with a reflux condenser, a dropping funnel, a stirring rod, and a tube for introducing nitrogen was put 283 ml of cyclohexane, and 0.29 g of a 25 wt % aqueous solution of sodium polyoxyethylene lauryl ether sulfate (average number of added moles of ethylene oxide=2) and a solution of 1.76 g of sodium acylated glutamate (AMISOFT HS-11) in 6.2 g of water were added thereto, followed by stirring at 300 rpm to disperse. After displacing the atmosphere with nitrogen, the bath temperature was raised to 75° C. The monomer/initiator aqueous solution as prepared in Example 1 was added dropwise into the flask over a 60-minute period. After completion of the addition, the same procedure as in Example 1 was repeated to obtain partially crosslinked sodium acrylate polymer particles as irregular-shaped gel granules. The same measurements as in Example 1 were carried out for the resulting irregular-shaped polymer particles. The results obtained are shown in Table 1 below.

EXAMPLE 6

To the monomer/initiator aqueous solution prepared in Example 1 was added 0.29 g of a 25. wt % aqueous solution of sodium polyoxyethylene lauryl ether sulfate (average number of added moles of ethylene oxide=2) to prepare a uniform monomer/initiator aqueous solution. Otherwise in the same manner as in Example 1 partially crosslinked sodium acrylate polymer particles were obtained as irregular-shaped gel granules. The same measurements as in Example 1 were carried out for the resulting irregular-shaped polymer particles. The results obtained are shown in Table 1 below.

EXAMPLE 7

To the monomer/initiator aqueous solution prepared in Example 1 was further added a solution of 1.76 g of sodium acylated glutamate (AMISOFT HS-11) in 6.2 g of water to prepare a uniform monomer/initiator/dispersant aqueous solution. Separately, 283 ml of cyclohexane was put in a 500 ml flask equipped with a reflux condenser, a dropping funnel, a stirring rod, and a tube for introducing nitrogen. To the flask was added 0.29 g of a 25 wt % aqueous solution of sodium polyoxyethylene lauryl ether sulfate (average number of added moles of ethylene oxide=2), followed by stirring at 300 rpm to disperse. After displacing the atmosphere with nitrogen, the bath temperature was raised to 75° C. The above prepared monomer/initiator/dispersant aqueous solution was added dropwise to the flask over a 60-minute period. Otherwise in the same manner as in Example 1 partially crosslinked sodium acrylate polymer particles were obtained as irregular-shaped gel granules. The same measurements as in Example 1 were carried out for the resulting irregular-shaped polymer particles. The results obtained are shown in Table 1 below.

EXAMPLE 8

To the monomer/initiator aqueous solution prepared in Example 1 was further added a solution of 0.44 g of sodium acylated glutamate (AMISOFT HS-11) in 1.55 g of water to prepare a uniform monomer/initiator/dispersant aqueous solution. Separately, 283 ml of cyclohexane was put in a 500 ml flask equipped with a reflux condenser, a dropping funnel, a stirring rod, and a tube for introducing nitrogen. To the flask were added 1.32 g of a sodium acylated glutamate AMISOFT HS-11 and 4.65 g of water, followed by stirring at 300 rpm to disperse. After displacing the atmosphere with nitrogen, the bath temperature was raised to 75° C. The above prepared monomer/initiator/dispersant aqueous solution was added dropwise to the flask over a 60-minute period. Otherwise in the same manner as in Example 1 partially crosslinked sodium acrylate polymer particles were obtained as irregular-shaped gel granules. The same measurements as in Example 1 were carried out for the resulting irregular-shaped polymer particles. The results obtained are shown in Table 1 below.

COMPARATIVE EXAMPLE 1

Spherical polymer particles were obtained in the same manner as in Example 1, except for replacing the aqueous solution of sodium acylated glutamate as a dispersant with 0.9 g of ethyl cellulose. The same measurements as in Example 1 were carried out for the resulting polymer particles. The results obtained are shown in Table 1 below.

COMPARATIVE EXAMPLE 2

Spherical polymer particles were obtained in the same manner as in Example 1, except for replacing the aqueous solution of sodium acylated glutamate as a dispersant with 2.9 g of sorbitan monostearate (RHEODOL SP-S10, produced by Kao Corp). The same measurements as in Example 1 were carried out for the resulting polymer particles. The results obtained are shown in Table 1 below.

COMPARATIVE EXAMPLE 3

Irregular-shaped polymer particles were obtained in the same manner as in Example 1, except for replacing the aqueous solution of sodium acylated glutamate used as a dispersant with 0.87 g of a 25 wt % aqueous solution of sodium polyoxyethylene lauryl ether sulfate (average number of added moles of ethylene oxide=2). The same measurements as in Example 1 were carried out for the resulting polymer particles. The results obtained are shown in Table 1 below.

TABLE 1

|  | Average Particle Size ($\mu$m) | Equilibrated Water Absorption on Swelling (g/g) | Water Absorption Representing Rate of Water Absorption (ml/0.3 g) | Rate of Liquid Permeation (ml/min) | Stability |
|---|---|---|---|---|---|
| Examples |  |  |  |  |  |
| 1 | 420 | 66 | 0.6 | 21 | B |
| 2 | 720 | 71 | 0.1 | 35 | B |
| 3 | 860 | 64 | 0.1 | 34 | B |
| 4 | 680 | 64 | 0.2 | 29 | B |
| 5 | 510 | 65 | 0.2 | 25 | B |
| 6 | 320 | 63 | 0.8 | 15 | B |

TABLE 1-continued

|   | Average Particle Size (μm) | Equilibrated Water Absorption on Swelling (g/g) | Water Absorption Representing Rate of Water Absorption (ml/0.3 g) | Rate of Liquid Permeation (ml/min) | Stability |
|---|---|---|---|---|---|
| 7 | 400 | 68 | 0.4 | 25 | B |
| 8 | 450 | 63 | 0.4 | 29 | B |
| Comparative Examples | | | | | |
| 1 | 320 | 63 | 0.4 | 3 | D |
| 2 | 90 | 60 | 0.3 | 5 | D |
| 3 | 410 | 65 | 0.9 | 20 | D |

EXAMPLE 9

Acrylic acid (72.1 g) was diluted with 18.0 g of water and neutralized with 98.9 g of a 30 wt % aqueous solution of sodium hydroxide while cooling. To the solution was added 5.4 g of a 1.3 wt % aqueous solution of 2,2'-azobis(2-amidinopropane) dihydrochloride to prepare a uniform monomer/initiator aqueous solution.

Separately, 283 ml of cyclohexane was put into a 500 ml flask equipped with a reflux condenser, a dropping funnel, a stirring rod, and a tube for introducing nitrogen, and 1.76 g of sodium acylated glutamate (AMISOFT HS-11) and 6.2 g of water were added thereto, followed by stirring at 300 rpm to disperse. After displacing the atmosphere with nitrogen, the bath temperature was raised to 75° C. The above-prepared monomer/initiator aqueous solution was added dropwise into the flask over a period of 60 minutes. After completion of the addition, the mixture was further stirred at a bath temperature of 75° C. for 0.25 hour and then at a bath temperature of 80° C. for 2 hours to conduct polymerization.

During the reaction, water of the refluxing water/cyclohexane azeotropic mixture was driven out of the system to adjust the water content of the resulting water-absorbing resin at 30 parts by weight or lower per 100 parts by weight of the resin. To the cyclohexane having dispersed therein the water-containing water-absorbing resin was added dropwise 1.8 g of a 1.55% aqueous solution of an epoxy type crosslinking agent (polyglycerol polyglycidyl ether DENOCOL EX-512 produced by Nagase Kasei K.K.), over a 5-minute period, and the mixture was allowed to react for 120 minutes. The reaction product was taken out, fractionated, and dried under reduced pressure to obtain 88.4 g of partially crosslinked sodium acrylate polymer particles as irregular-shaped gel granules. The average particle size, equilibrated water absorption on swelling, water absorption representing the rate of water absorption, rate of permeation of physiological saline, and particle stability of the resulting irregular-shaped polymer particles were measured. The results obtained are shown in Table 2 below.

EXAMPLE 10

Partially crosslinked sodium acrylate polymer particles as irregular-shaped gel granules were obtained in the same manner as in Example 9, except that 0.007 g of an epoxy type crosslinking agent (polyglycerol polyglycidyl ether DENOCOL EX-512 produced by Nagase Kasei K.K.), was added to the monomer/initiator aqueous solution of Example 9 to prepare a uniform monomer/initiator aqueous solution. The same measurements as in Example 9 were carried out for the resulting irregular-shaped polymer particles. The results obtained are shown in Table 2 below.

EXAMPLES 11 TO 23

Irregular-shaped polymer particles were obtained in the same manner as in Example 9, except for using the dispersant shown in Table 2 at the amount shown in Table 2 and changing the amount of water to be added to the flask shown in Table 2. The same measurements as in Example 9 were carried out for the resulting irregular-shaped polymer particles. The results obtained are shown in Table 2 below.

The dispersant used in Example 23, monosodium N-palmitoyl-aspartate, was synthesized as follows.

In 780 ml of carbon tetrachloride was dissolved 100 g of palmitic acid, and 31.3 g of sulfuric anhydride was added thereto dropwise with stirring while maintaining at −0.5° to 0° C. After the addition, the reaction was further continued for an additional 60-minute period to obtain a palmitic-sulfuric mixed anhydride.

In a mixed solvent of 280 ml of water and 188 ml of acetone was suspended 52.0 g of L-aspartic acid, and 31.3 g of sodium hydroxide was added to the suspension to prepare a disodium L-aspartate solution. To the disodium L-aspartate solution were simultaneously added dropwise the above prepared palmitic-sulfuric mixed anhydride and a solution of 46.9 g of sodium hydroxide in 117 ml of water under cooling with ice. After completion of the addition, the mixture was stirred for 1 hour. The organic solvent was evaporated under reduced pressure, and the residue was adjusted to pH 1 with 6N sulfuric acid. The precipitated crude crystals of N-palmitoyl-L-aspartic acid were collected by filtration, dried, and washed with benzine. The crude crystals were again dried, and the solvent was evaporated. The resulting crude crystals (50 g) were dissolved in 50 g of water and kneaded with 11.34 g of sodium hydrogencarbonate in a kneader at a mixture temperature of 50° C. for 1 hour. The mixture was dried under reduced pressure (150 mmHg) at 85° C. to obtain 52 g of monosodium N-palmitoyl-aspartate.

TABLE 2

| Examples | Dispersant | Amount (g) | Water (g) | Average Particle Size ($\mu$m) | Equilibrated Water Absorption on Swelling (g/g) | Water Absorption Representing Rate of Water Absorption (ml/0.3 g) | Rate of Liquid Permeation (ml/min) | Stability |
|---|---|---|---|---|---|---|---|---|
| 9 | AMISOFT HS-11 | 1.76 | 6.2 | 350 | 64 | 3.2 | 35 | A |
| 10 | AMISOFT HS-11 | 0.88 | 6.2 | 520 | 57 | 3.1 | 33 | A |
| 11 | AMISOFT HS-11 | 0.88 | 6.2 | 530 | 61 | 2.9 | 31 | A |
| 12 | AMISOFT HS-11 | 0.88 | 3.1 | 720 | 63 | 2.1 | 39 | A |
| 13 | AMISOFT HS-11 | 0.88 | 0.0 | 580 | 67 | 2.8 | 65 | A |
| 14 | AMISOFT HS-11 | 0.44 | 6.2 | 830 | 68 | 2.2 | 68 | B |
| 15 | AMISOFT HS-11 | 0.44 | 3.1 | 1020 | 71 | 2.1 | 86 | B |
| 16 | AMISOFT GS-11 | 0.88 | 6.2 | 600 | 60 | 2.4 | 57 | A |
| 17 | AMISOFT MS-11 | 0.88 | 6.2 | 690 | 57 | 2.5 | 62 | A |
| 18 | AMISOFT LS-11 | 0.88 | 6.2 | 1320 | 65 | 1.9 | 78 | A |
| 19 | AMISOFT HK-11 | 0.88 | 6.2 | 1090 | 57 | 1.5 | 75 | A |
| 20 | AMISOFT HS-21 | 0.88 | 6.2 | 970 | 65 | 2.0 | 65 | A |
| 21 | AMISOFT GS-21 | 0.88 | 6.2 | 1320 | 58 | 1.4 | 80 | A |
| 22 | AMISOFT HA | 0.88 | 6.2 | 1373 | 65 | 1.3 | 73 | A |
| 23 | Monosodium N-palmitoyl-aspartate | 0.88 | 6.2 | 1410 | 61 | 0.9 | 95 | A |

The anionic surface active agents (I) as a dispersant used in Examples are shown below.

| Anionic Surface Active Agent (I) | $R^1$ | $M^1$, $M^2$ |
|---|---|---|
| AMISOFT HS-11 | $C_{17}H_{35}$ | H, Na / Na, H |
| AMISOFT LS-11 | $C_{11}H_{23}$ | H, Na / Na, H |
| AMISOFT MS-11 | $C_{13}H_{27}$ | H, Na / Na, H |
| AMISOFT GS-11 | $C_7H_{15}$~$C_{23}H_{47}$ | H, Na / Na, H |
| AMISOFT HK-11 | $C_{17}H_{35}$ | H, Na / Na, H |
| AMISOFT HS-21 | $C_{17}H_{35}$ | Na, Na |
| AMISOFT GS-21 | $C_7H_{15}$~$C_{23}H_{47}$ | Na, Na |
| AMISOFT HA | $C_{17}H_{35}$ | H, H |

The distribution of the number of carbon atoms of $R^1$ in AMISOFT GS-21 and AMISOFT GS-11 is as follows.

| Saturated | | Unsaturated | |
|---|---|---|---|
| $C_{10}$ or less; | 3% or less | $C_{18}$ (one unsaturated bond); | 9% |
| $C_{12}$; | 15% | $C_{18}$ (two unsaturated bonds); | 12% |
| $C_{14}$; | 3% | | |
| $C_{16}$; | 25% | | |
| $C_{18}$ or more: | 15% | | |

COMPARATIVE EXAMPLE 4

Spherical polymer particles were obtained in the same manner as in Example 9, except for replacing the aqueous solution of sodium acylated glutamate as a dispersant with 0.9 g of ethyl cellulose. The same measurements as in Example 9 were carried out for the resulting polymer particles. The results obtained are shown in Table 3 below.

COMPARATIVE EXAMPLE 5

Spherical polymer particles were obtained in the same manner as in Example 9, except for replacing the aqueous solution of sodium acylated glutamate as a dispersant with 0.9 g of ethyl cellulose and changing the concentration of the epoxy type crosslinking agent aqueous solution, which was to be added to the cyclohexane solution after polymerization, from 1.55% to 5.81%. The same measurements as in Example 9 were carried out for the resulting polymer particles. The results obtained are shown in Table 3 below.

COMPARATIVE EXAMPLE 6

Spherical polymer particles were obtained in the same manner as in Example 9, except for replacing the aqueous solution of sodium acylated glutamate as a dispersant with 2.9 g of sorbitan monostearate (RHEODOL SP-S10). The same measurements as in Example 9 were carried out for the resulting polymer particles. The results obtained are shown in Table 3 below.

COMPARATIVE EXAMPLE 7

Spherical polymer particles were obtained in the same manner as in Example 9, except for replacing the aqueous solution of sodium acylated glutamate as a dispersant with 2.9 g of sorbitan monostearate (RHEODOL SP-S10) and changing the concentration of the epoxy type crosslinking agent aqueous solution, which was to be added to the cyclohexane solution after polymerization, from 1.55% to 5.81%. The same measurements as in Example 9 were carried out for the resulting polymer particles. The results obtained are shown in Table 3 below.

COMPARATIVE EXAMPLE 8

Irregular-shaped polymer particles were obtained in the same manner as in Example 9, except for replacing the aqueous solution of sodium acylated glutamate as a dispersant with 0.87 g of a 25 wt % aqueous solution of sodium polyoxyethylene lauryl ether sulfate (average number of added moles of ethylene oxide=2). The same measurements as in Example 9 were carried out for the resulting polymer particles. The results obtained are shown in Table 3 below.

COMPARATIVE EXAMPLE 9

Irregular-shaped polymer particles were obtained in the same manner as in Example 9, except for replacing the aqueous solution of sodium acylated glutamate as a dispersant with 0.87 g of a 25 wt % aqueous solution of sodium polyoxyethylene lauryl ether sulfate (average number of added moles of ethylene oxide=2) and changing the concentration of the epoxy type crosslinking agent aqueous solution, which was to be added to the cyclohexane solution after polymerization, from 1.55% to 5.81%. The same measurements as in Example 9 were carried out for the resulting polymer particles. The results obtained are shown in Table 3 below.

solved in 0.8 g of water to prepare a uniform monomer/initiator aqueous solution.

Separately, 283 ml of cyclohexane was put into a 500-ml flask equipped with a reflux condenser, a dropping funnel, a stirring rod and a tube for introducing nitrogen, and 0.27 g of a 27 wt % aqueous solution of sodium polyoxyethylene (average number of added moles of ethylene oxide=2) alkyl (dodecyl 75% and teradecyl 25%) ether sulfate (EMAL E-27C, produced by Kao Corp.) were added thereto, fol-

TABLE 3

| Comparative Examples | Average Particle Size ($\mu$m) | Equilibrated Water Absorption on Swelling (g/g) | Water Absorption Representing Rate of Water Absorption (ml/0.3 g) | Rate of Liquid Permeation (ml/min) | Stability |
|---|---|---|---|---|---|
| 4 | 350 | 65 | 4.4 | 15 | D |
| 5 | 340 | 43 | 6.2 | 23 | B |
| 6 | 120 | 60 | 6.6 | 25 | D |
| 7 | 110 | 40 | 6.5 | 30 | B |
| 8 | 460 | 63 | 3.0 | 60 | D |
| 9 | 480 | 45 | 5.6 | 94 | B |

EXAMPLE 24

To the monomer/initiator aqueous solution described in Example 1 was added 0.088 g of sodium acylated glutamate (AMISOFT MS-11) dissolved in 0.8 g of water to prepare a uniform monomer/initiator aqueous solution.

Separately, 283 ml of cyclohexane was put into a 500 ml flask equipped with a reflux condenser, a dropping funnel, a stirring rod, and a tube for introducing nitrogen, and 0.29 g of a 25 wt % aqueous solution of sodium polyoxyethylene (average number of added moles of ethylene oxide=2.8) dodecyl ether sulfate (EMAL 20C, produced by Kao Corp.) was added thereto, followed by stirring at 300 rpm to disperse. After displacing the atmosphere with nitrogen, the bath temperature was raised to 75° C.

The above-prepared monomer/initiator aqueous solution was added dropwise to the flask over a period of 60 minutes. After the addition, the same procedure as in Example 1 was repeated to obtain irregular-shaped gel granules. The same measurements as in Example 1 were carried out for the resulting irregular-shaped polymer particles. The results obtained are shown in Table 4 below. The resulting product has a narrow distribution of the particle size and a high rate of liquid permeation.

TABLE 4

| Examples | Average Particle Size ($\mu$m) | Equilibrated Water Absorption on Swelling (g/g) | Water Absorption Representing Rate of Water Absorption (ml/0.3 g) | Rate of Liquid Permeation (ml/min) | Stability |
|---|---|---|---|---|---|
| 24 | 560 | 65 | 0.6 | 121 | B |
| 25 | 650 | 70 | 0.4 | 153 | B | was added thereto, followed by stirring at 300 rpm to disperse. After displacing the atmosphere with nitrogen, the bath temperature was raised to 75° C.

The above-prepared monomer/initiator aqueous solution was added dropwise to the flask over a period of 60 minutes. After the addition, the same procedure as in Example 1 was repeated to obtain irregular-shaped gel granules. The same measurements as in Example 1 were carried out for the resulting irregular-shaped polymer particles. The results obtained are shown in Table 4 below. The resulting product has a narrow distribution of the particle size and a high rate of liquid permeation.

EXAMPLE 25

To the monomer/initiator aqueous solution described in Example 1 was added 0.044 g of acylated glutamate dis-

What is claimed is:

1. A process for producing polymer particles which comprises polymerizing a water-soluble polymerizable monomer in a system comprising a hydrophobic organic solvent inert to the polymerization and an aqueous solution of the water-soluble polymerizable monomer, and as a dispersant an anionic surface active agent represented by formula (I):

wherein $R^1$ represents a straight-chain or branched alkyl, alkenyl or 2-hydroxyalkyl group having 5 to 29 carbon atoms; $M^1$ and $M^2$, which may be the same or different, each represent an alkali metal ion, an ammonium ion or a hydrogen atom; and n represents 1 or 2.

2. The process according to claim 1, wherein $R^1$ in formula (I) is an alkyl group having 11 to 23 carbon atoms.

3. The process according to claim 1, wherein n in formula (I) is 2.

4. The process according to claim 1, wherein the dispersant is used at an amount of 0.01 to 10 parts by weight per 100 parts by weight of the water-soluble polymerizable monomer.

5. The process according to claim 4, wherein the dispersant is used at an amount of 0.05 to 1 part by weight per 100 parts by weight of the water-soluble polymerizable monomer.

6. The process according to claim 1, wherein the water-soluble polymerizable monomer is an olefinic unsaturated carboxylic acid or an alkali salt thereof.

7. The process according to claim 1, wherein the polymerization is carried out in the copresence of, as a dispersant, a surface active agent represented by formula (II):

$$R^2O(A)_m SO_3 M^3 \qquad (II)$$

wherein $R^2$ represents a straight-chain or branched alkyl or alkenyl group having 6 to 22 carbon atoms, or an aryl group having 12 to 28 carbon atoms in total; A represents a straight-chain or branched alkylene or oxyalkylene group having 2 or 3 carbon atoms; $M^3$ represents an alkali metal ion, an ammonium ion or a hydrogen atom; and m represents a number of from 0 to 22 in average.

8. The process according to claim 7, wherein the surface active agent represented by formula (II) is used at an amount of 0.01 to 10 parts by weight per 100 parts by weight of the water-soluble polymerizable monomer.

* * * * *